3,468,499
WIG STAND
Peter A. Rodgers, 1125 E. Redondo Blvd.,
Inglewood, Calif. 90302
Filed June 5, 1967, Ser. No. 643,602
Int. Cl. A45d 44/14
U.S. Cl. 223—66                3 Claims

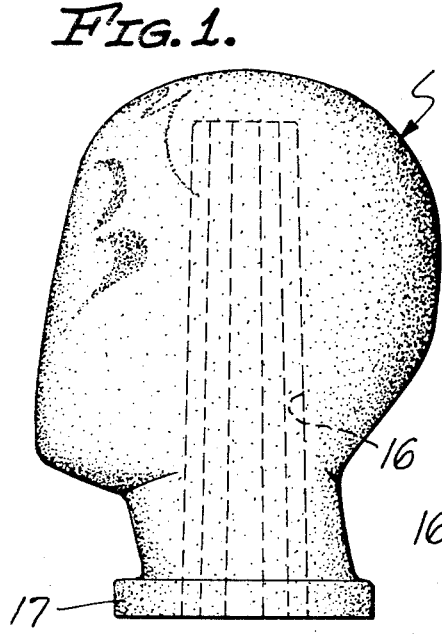
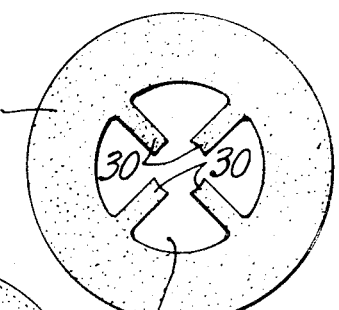
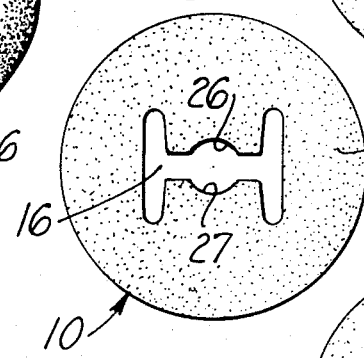
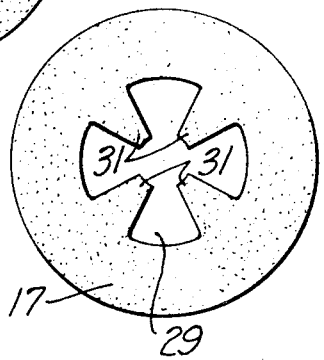
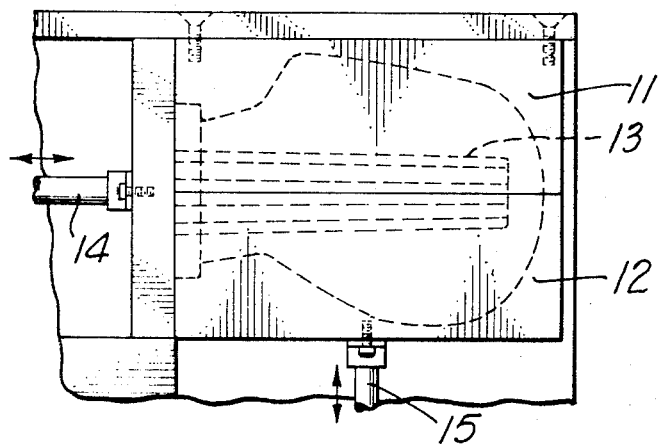
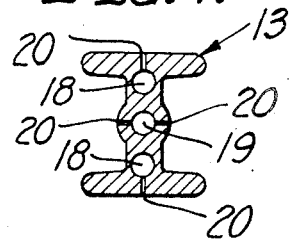
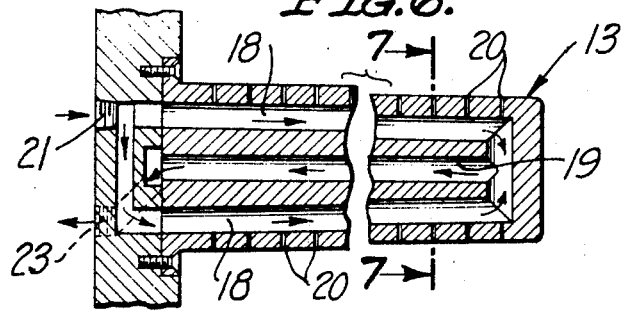
INVENTOR
PETER A. RODGERS
BY
Robert C. Comstock
ATTORNEY United States Patent Office 3,468,499
Patented Sept. 23, 1969

ABSTRACT OF THE DISCLOSURE

A wig stand made of rigid expanded polystyrene foam material. The wig stand is formed in a three-part mold which includes an elongated plug. The plug forms a spindle receiving opening in the wig stand, which opening extends vertically upwardly from the base to adjacent the top of the stand. The central portion of the opening is dimensioned and adapted to fit around a conventional circular spindle, but the overall cross-section of the opening is substantially larger.

BACKGROUND OF THE INVENTION

Field of the invention

The invention relates to a molded plastic wig stand for holding a wig or other hairpiece.

Description of the prior art

Wig stands are now being made of solid molded plastic foam material, with a vertically directed opening in the base which is identical in size and shape to a conventional spindle, which has an outside circular diameter of one inch at the base and tapers slightly toward the top. Because of their extreme thickness, the stands take a long time to cool and the molding cycle is accordingly long.

SUMMARY OF THE INVENTION

This invention relates to a wig stand made of molded plastic materials in which the stand is provided with a vertically directed spindle receiving opening which is adapted to fit a conventional spindle, but which has a substantially larger overall diameter than the spindle.

The increased size of the spindle receiving opening acts to substantially reduce the thickness of plastic material which must be cooled in molding the part. The larger plug used to form the spindle receiving opening is preferably supplied with circulating water, so that cooling of the part being molded is accomplished from the inside of the spindle receiving opening. This increased cooling action further decreases the time required for each molding cycle. The use of a larger opening also permits the use of less raw material per part.

It is accordingly among the objects of the invention to provide a wig stand which can be molded more quickly by using a centrally disposed plug which reduces the maximum thickness of the park and which also cools the part from the inside. While the wig stand has an opening of larger size than a conventional circular spindle, it still fits on a conventional spindle.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

BRIEF DESCRIPTION OF THE DRAWING

FIG. 1 is a front elevational view of a wig stand constructed in accordance with my invention, with the spindle receiving opening shown in dotted lines;

FIG. 2 is a bottom plan view of the same;

FIG. 3 is a bottom plan view of an alternative wig stand, showing a different shape of spindle receiving opening;

FIG. 4 is a bottom plan view of a further alternative wig stand, showing still another shape of spindle receiving opening;

FIG. 5 is a side elevational view of the mold in which the wig stand is formed, with the plug and contour of the mold openings shown in dotted lines;

FIG. 6 is an elongated broken longitudinal sectional view of the plug, showing its internal structure;

FIG. 7 is a transverse sectional view of the plug taken on line 7—7 of FIG. 6.

DESCRIPTION OF THE PREFERRED EMBODIMENT

A preferred embodiment which has been selected to illustrate the invention comprises a wig stand 10, which is preferably molded of substantially rigid plastic material such as expanded polystyrene foam. The outer shape and contour of the wig stand 10 may be varied as desired, but it customarily resembles the shape and contour of the human head. It accordingly possesses substantial thickness, particularly across the upper center areas.

The wig stand 10 is formed in a three-part mold, comprising a stationary part 11, a movable part 12 and an elongated plug 13. The movable part 12 and the plug 13 are moved reciprocally with respect to the stationary part 11 by conventional double-acting hydraulic cylinders (not shown in the drawings) acting upon pistons 14 and 15.

Each of the mold parts 11 and 12 has an opening therein corresponding to the outer contour of one half of the wig stand 10. The plug 13 has an outer contour corresponding to the contour of a vertically directed elongated opening 16, which extends upwardly from the base 17 of the wig stand 10.

As shown in FIGS. 6 and 7 of the drawings, the plug 13 is provided with a pair of outside inlet passages 18, each connected adjacent the upper end of the plug 13 with a centrally disposed return passage 19. A plurality of small outlets 20 extend from the passages 18 and 19 through the adjacent walls of the plug 13.

When the wig stand 10 is being molded, steam is injected through an opening 21 into the inlet passages 18 of the plug 13. This steam is ejected out through the outlets 20 to expand the polystyrene beads within the mold through the simultaneous application of heat and moisture.

When the polystyrene has been fully expanded to form the wig stand 10, the part must be cooled before it is removed from the mold. This cooling is facilitated by the injection of water under pressure into the opening 21. The water passes through the inlet passages 18 and then back through the return passage 19 and out through an outlet opening 23.

The water is preferably circulated constantly and continuously through the passages 18 and 19 in order to convey heat from the inside of the molded part. The timing of the molding cycle and particularly the cooling portion thereof is accordingly substantially shortened by the action of the plug 13 in substantially reducing the maximum thickness which must be cooled and in applying cooling to the inside of the part.

When the part has been sufficiently cooled, the plug 13 is moved a short distance away from the mold parts 11 and 12 in order to provide clearance for movement of the movable part 12 away from the stationary part 11. After the movable part 12 has been moved to open position, the plug 13 is withdrawn and the completed wig stand 10 drops from the stationary part 11 of the mold.

It will be noted that the molded wig stand 10 has an opening 16 which is formed by the plug 13 and which extends vertically upwardly from the base 17 to adjacent the top of the wig stand 19. The center of the opening 16 is surrounded by a pair of arcuate portions 26 and 27. The arcuate portions 26 and 27 are dimensioned and adapted to fit around and engage the periphery of a conventional spindle which has a circular cross-sectional configuration. The arcuate portions 26 and 27 preferably engage the periphery of the spindle along the entire length of the spindle, which is customarily substantially shorter in length than the opening 16.

It will be noted that while the opening 16 provides engagement with the spindle, it has an overall diameter which is substantially greater than the diameter of the spindle. This increased diameter of the opening 16 reduces the maximum thickness of the part and provides some saving in material as well. The molded wig stand 10 will accordingly fit on a conventional spindle, even though its spindle receiving opening 16 is substantially larger in overall diameter than the spindle which it receives.

FIGS. 3 and 4 of the drawings show alternative shapes of spindle receiving openings 28 and 29, respectively. The central portions of these openings are surrounded by four spindle engaging members 30 and 31 respectively, which engage the periphery of the spindle continuously along the entire length of the spindle. The plugs used to form the openings 28 and 29 would correspond in contour to the openings. The plugs might have two, three or four inlet passages formed in the outer portions thereof for the passage of steam and water, with a single return passage extending back through the center.

It has been found that with my invention the molding cycle time for making wig stands can be reduced as much as 20 to 25 percent and that as much as 10 percent of the material required may be saved.

I claim:
1. A wig stand adapted for use on a conventional elongated vertically directed spindle having a circular cross-sectional configuration, said wig stand being formed of substantially rigid molded polystyrene material or the like, said wig stand having a substantially thick upper portion resembling the shape of a human head, said wig stand having a substantially flat base, a spindle receiving opening extending vertically upwardly through said wig stand substantially along its vertical axis from said base to adjacent the top of said wig stand, said spindle receiving opening extending through said thick upper portion of said wig stand, said spindle receiving opening having a central open portion surrounded by a plurality of integral opposed arcuate sections defining a circle, said arcuate sections being constructed and arranged to fit around and engage the outer periphery of said spindle to mount said wig stand on said spindle, said spindle receiving opening having a plurality of outer open portions disposed between said arcuate sections and extending radially outwardly substantially beyond said central open portion, said outer open portions having a circular cross-sectional area substantially greater than the cross-sectional area of said central open portion defined by said arcuate portions, whereby the maximum cross-sectional of said wig stand between the peripheral edges of said wig stand and said central circular opening is substantially reduced, to shorten the molding time of said wig stand and to lessen the amount of material required to manufacture said wig stand.

2. The structure described in claim 1, said spindle receiving opening having a pair of opposed arcuate sections, with a pair of outer open portions disposed between said arcuate sections, each of said outer open portions having an inner part thereof extending radially outwardly from the central open portion and a narrow elongated outer part extending transversely to said inner part, said outer parts extending substantially parallel to each other.

3. The structure described in claim 1, said spindle receiving opening having four equally spaced arcuate sections, with four equally spaced radially extending open portions disposed between them, said open portions defining a circle of substantially larger diameter than said central open portion, said circle being intersected by said arcuate sections.

References Cited
UNITED STATES PATENTS

| | | | |
|---|---|---|---|
| 2,294,661 | 9/1942 | Hibbard | 248—38 X |
| 3,158,094 | 11/1964 | Harris et al. | 211—695 |
| 3,197,093 | 7/1965 | Doran | 223—66 |
| 3,288,415 | 11/1966 | Eichoff | 223—66 X |
| 3,310,267 | 3/1967 | Koehler | 248—176 |

MERVIN STEIN, Primary Examiner

G. V. LARKIN, Assistant Examiner

U.S. Cl. X.R.

264—299, 41